United States Patent
Su et al.

(10) Patent No.: US 12,443,461 B2
(45) Date of Patent: Oct. 14, 2025

(54) CIRCUIT AND METHOD OF HANDLING LOAD BALANCE

(71) Applicant: Realtek Semiconductor Corp., HsinChu (TW)

(72) Inventors: Wun-Ci Su, HsinChu (TW); Jhe-Yi Lin, HsinChu (TW); Yu-Jhao Yang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 432 days.

(21) Appl. No.: 18/143,048

(22) Filed: May 3, 2023

(65) Prior Publication Data

US 2023/0359502 A1 Nov. 9, 2023

(30) Foreign Application Priority Data

May 4, 2022 (TW) .................................. 111116770

(51) Int. Cl.
*G06F 9/50* (2006.01)
(52) U.S. Cl.
CPC .................................... *G06F 9/505* (2013.01)
(58) Field of Classification Search
CPC ...................................................... G06F 9/505
See application file for complete search history.

(56) References Cited

U.S. PATENT DOCUMENTS

| | | |
|---|---|---|
| 6,912,229 B1 | 6/2005 | Lauro |
| 7,260,716 B1 | 8/2007 | Srivastava |

(Continued)

FOREIGN PATENT DOCUMENTS

| | | |
|---|---|---|
| TW | 201713160 A | 4/2017 |
| TW | 202143770 A | 11/2021 |
| WO | 2021/204209 A1 | 10/2021 |

OTHER PUBLICATIONS

IEEE Computer Society, IEEE P802.11be TM/D1.1 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), Jul. 2021.

(Continued)

*Primary Examiner* — Charlie Sun
(74) *Attorney, Agent, or Firm* — Winston Hsu (57) ABSTRACT

A load balance circuit includes: a storing circuit, for storing first user field number(s) corresponding to first node(s) in a minimum full binary tree, wherein first resource unit(s) (RU(s)) corresponding to the first node(s) is smaller than or equal to an RU size; a user field number generation circuit, for generating third user field number(s) according to second user field number(s) corresponding to second node (s) in the minimum full binary tree, and generating second weight(s) according to first weight(s) corresponding to the second node(s), wherein second RU(s) corresponding to the second node(s) is greater than the RU size; and a load balance calculation circuit, for generating a plurality of user field numbers corresponding to a plurality of content channels according to the first user field number(s), the third user field number(s), the second weight(s), a load balance function and the first weight(s).

10 Claims, 7 Drawing Sheets

(56) References Cited

U.S. PATENT DOCUMENTS

| | | |
|---|---|---|
| 7,710,963 B1 | 5/2010 | Jain |
| 9,867,189 B2 | 1/2018 | Lee |
| 10,123,330 B2 * | 11/2018 | Josiam ................. H04L 5/0023 |
| 10,841,647 B2 | 11/2020 | Zavesky |
| 12,229,590 B2 | 2/2025 | Lin |
| 2017/0094664 A1 | 3/2017 | Lee |
| 2021/0349754 A1 * | 11/2021 | Lin ........................ G06F 9/505 |
| 2023/0198696 A1 | 6/2023 | Huang |
| 2025/0031214 A1 | 1/2025 | Huang |
| 2025/0182967 A1 | 6/2025 | Yamashita |
| 2025/0192958 A1 | 6/2025 | Park |

OTHER PUBLICATIONS

Lin et al., the specification, including the claims, and drawings in the U.S. Appl. No. 18/143,081, filed May 4, 2023.

\* cited by examiner

CIRCUIT AND METHOD OF HANDLING LOAD BALANCE

BACKGROUND OF THE INVENTION

1. Field of the Invention

The present invention relates to a circuit and a method used in a communication system, and more particularly, to a circuit and a method for handling load balance.

2. Description of the Prior Art

In a standard communication system, a transmitter may use resource units (RUs) and multiple RUs (MRUs) to generate a user field for configuring a user resource. This traditional method for generating the user field not only has high complexity, but also generates an excessively long user field that reduces bandwidth utilization efficiency. Thus, how to efficiently obtain a user field with a short length and generate a content channel with a short length is an important problem to be solved.

SUMMARY OF THE INVENTION

The present invention therefore provides a communication device and method for handling load balance to solve the abovementioned problem.

A load balance circuit comprises: a storing circuit, for storing at least one first user field number corresponding to at least one first node in a minimum full binary tree, wherein at least one first resource unit (RU) corresponding to the at least one first node is smaller than or equal to an RU size; a user field number generation circuit, coupled to the storing circuit, for generating at least one third user field number according to at least one second user field number corresponding to at least one second node in the minimum full binary tree, and generating at least one second weight according to at least one first weight corresponding to the at least one second node, wherein at least one second RU corresponding to the at least one second node is greater than the RU size; and a load balance calculation circuit, coupled to the user field number generation circuit, for generating a plurality of first user field numbers corresponding to a plurality of content channels according to the at least one first user field number, the at least one third user field number, the at least one second weight, a load balance function and the at least one first weight.

A method for handling load balance comprises: storing at least one first user field number corresponding to at least one first node in a minimum full binary tree, wherein at least one first resource unit (RU) corresponding to the at least one first node is smaller than or equal to an RU size; generating at least one third user field number according to at least one second user field number corresponding to at least one second node in the minimum full binary tree, and generating at least one second weight according to at least one first weight corresponding to the at least one second node, wherein at least one second RU corresponding to the at least one second node is greater than the RU size; and generating a plurality of first user field numbers corresponding to a plurality of content channels according to the at least one first user field number, the at least one third user field number, the at least one second weight, a load balance function and the at least one first weight.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
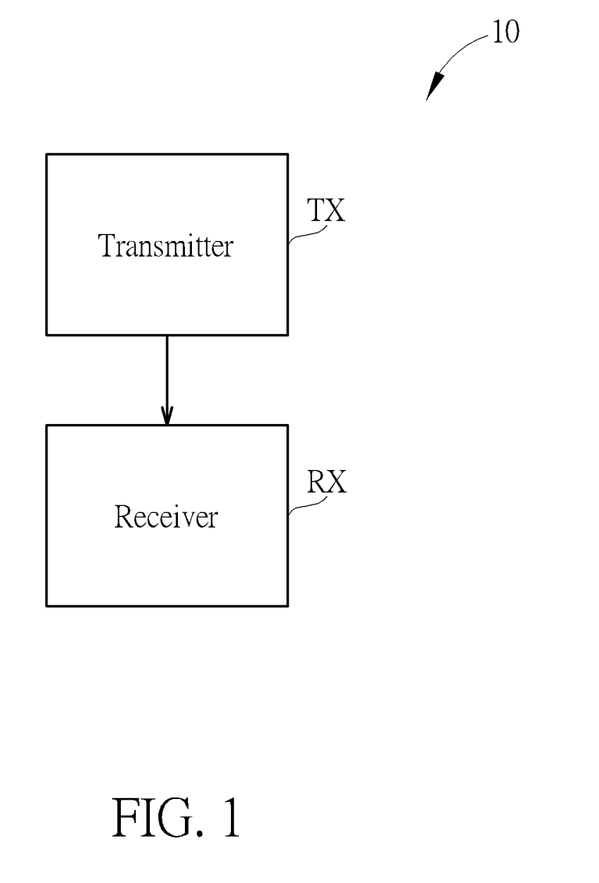
FIG. 1 is a schematic diagram of a communication system according to an example of the present invention.

FIG. 1 is a schematic diagram of a communication system 10 according to an example of the present invention. The communication system 10 is briefly composed of a transmitter TX and a receiver RX. The transmitter TX may be an access point (AP) in a wireless local area network (LAN). In addition, the transmitter TX and/or the receiver RX may be realized via a device(s) such as a mobile phone and a laptop, but is not limited herein. In one example, the transmitter TX and the receiver RX may support an Institute of Electrical and Electronics Engineers (IEEE) 802.11 standard (e.g., IEEE 802.11AX, 802.11be or a subsequent version). The IEEE 802.11 standard may support an Orthogonal Frequency Division Multiple Access (OFDMA) and/or a Multi-User Multiple-Input Multiple-Output (MU-MIMO), and defines an EHT-SIG field of an extremely high throughput multi-user physical protocol data unit (EHT-MU PPDU).

Figure 2:
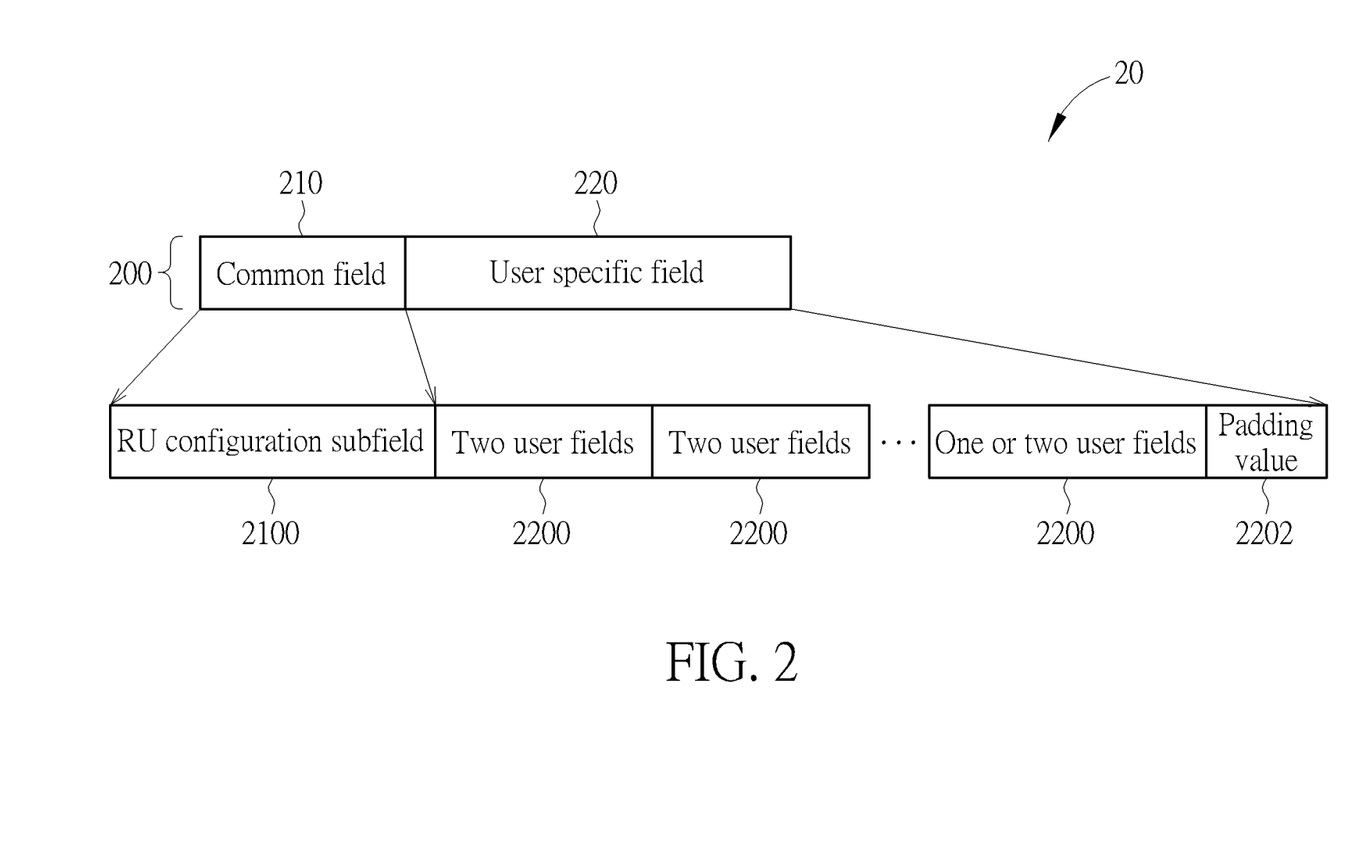
FIG. 2 is a schematic diagram of an EHT-SIG field according to an example of the present invention.

FIG. 2 is a schematic diagram of an EHT-SIG field 20 according to an example of the present invention. The EHT-SIG field 20 may be generated by the transmitter TX in FIG. 1. The EHT-SIG field 20 may comprise at least one content channel, and the at least one content channel may comprise at least one first content channel and at least one second content channel. As shown in FIG. 2, each content channel 200 comprises a common field 210 which comprises a resource unit (RU) configuration subfield 2100 for informing all scheduled stations of an RU assignment of all current data bandwidths. In one example, each content channel 200 may comprise a user specific field 220 which comprises multiple user fields 2200 for carrying transmission information of the specific scheduled station(s) (e.g. a scheduled station identity (STA ID) and related decode information). In one example, each content channel 200 comprises a padding value 2202 for padding a length of the user specific field 220 to satisfy a format requirement of the EHT-SIG field 20.

In one example, in the IEEE 802.11 standard, each RU smaller than or equal to a 242-tone may (e.g., must) be assigned at least one scheduled station. Accordingly, for a null RU, the transmitter TX may assign a null scheduled station with a scheduled STA ID 2046 in the EHT-SIG field. For an RU greater than the 242-tone, the transmitter TX may assign multiple user fields to multiple content channels in the EHT-SIG field, to ensure that user field numbers carried by the multiple content channels (i.e. lengths (e.g., sizes) of the multiple content channels) are the same or similar. In one example, a load balance function may be for calculating the user field numbers carried by the multiple content channels (i.e. lengths (e.g., sizes) of the multiple content channels), to ensure that the user field numbers carried by the multiple content channel are the same or similar. In one example, an excessively long length of the EHT-SIG field may make a Physical Layer Convergence Procedure (PLCP) have an excessively long length, resulting in a decrease in throughput.

Figure 3:
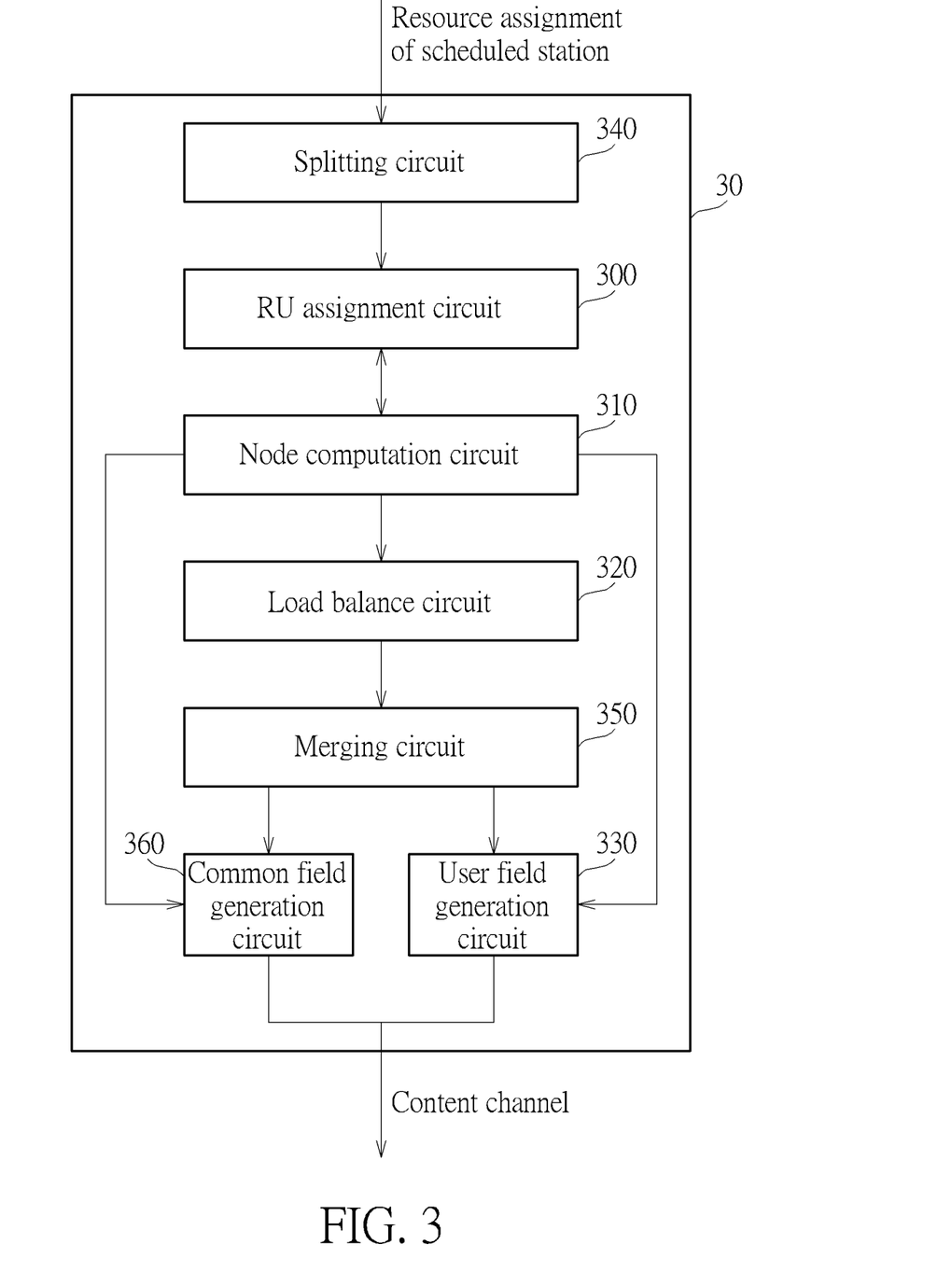
FIG. 3 is a schematic diagram of a content channel generation device according to an example of the present invention.

FIG. 3 is a schematic diagram of a content channel generation device 30 according to an example of the present invention. The content channel generation device 30 may realize the transmitter TX in FIG. 1, may generate the common field 210 and the user specific field 220 in FIG. 2 to generate the content channel 200, and may further generate the EHT-SIG field 20. The content channel generation device 30 may comprise an RU assignment circuit 300, a node computation circuit 310, a load balance circuit 320 and a user field generation circuit 330, and may comprise a splitting circuit 340, a merging circuit 350 and a common field generation circuit 360. In detail, the splitting circuit 340 is for generating a plurality of RUs according to a plurality of resource assignment. The RU assignment circuit 300 is coupled to the splitting circuit 340, and is for generating a full binary tree according to the plurality of RUs. The node computation circuit 310 is coupled to the RU assignment circuit 300, and is for generating a minimum full binary tree according to the full binary tree. The load balance circuit 320 is coupled to the node computation circuit 310, and is for generating a plurality of user field numbers corresponding to a plurality of content channels according to the minimum full binary tree and the load balance function. The merging circuit 350 is coupled to the load balance circuit 320, and is for generating traversal results of the minimum full binary tree according to a traversal algorithm and generating a combined traversal result according to the traversal results. The common field generation circuit 360 is coupled to the merging circuit 350, and is for generating a resource assignment indicator according to the combined traversal result to generate a common field. The common field generation circuit 360 is further coupled to the node computation circuit 310, to obtain (e.g. store) node information. In one example, a method in which the node computation circuit 310 generates the minimum full binary tree according to the full binary tree can be known by referring to the related patent application (application Ser. No. 17/211,852 Publication No. US20210349754A1), but is not limited herein.

Figure 4:
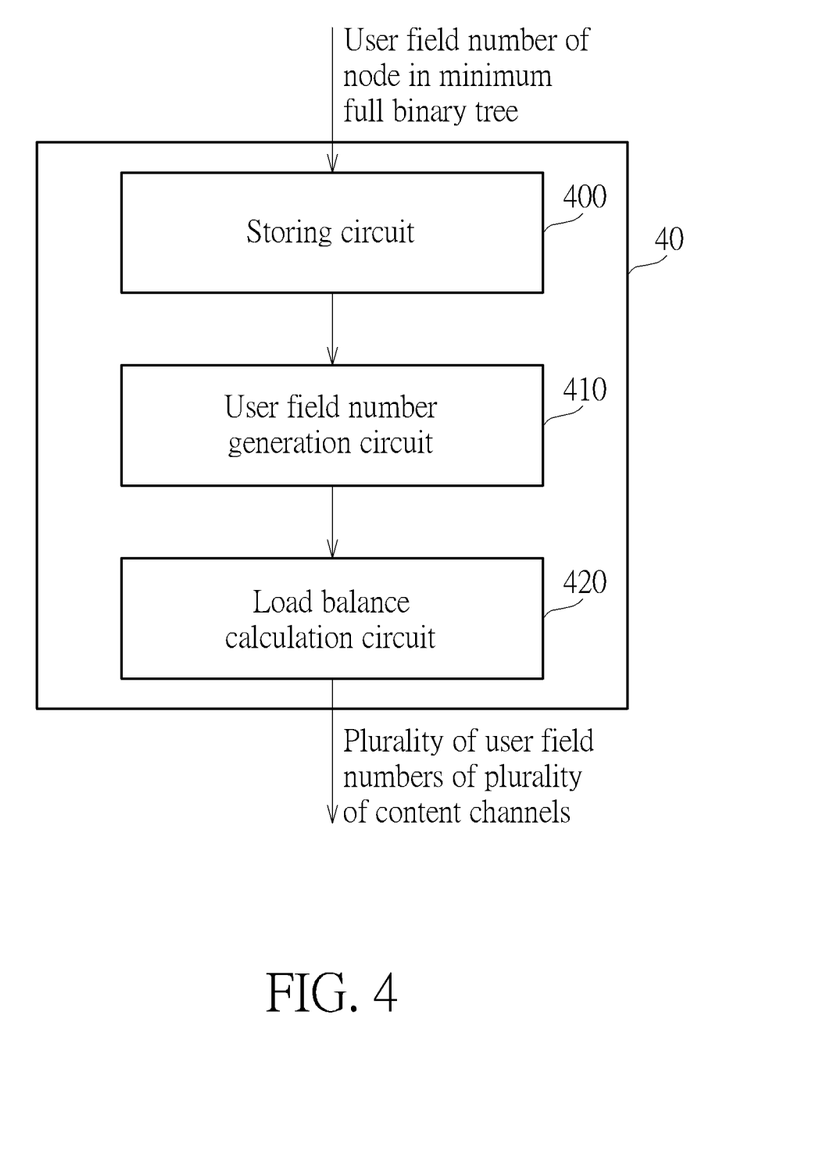
FIG. 4 is a schematic diagram of a load balance circuit according to an example of the present invention.

FIG. 4 is a schematic diagram of a load balance circuit 40 according to an example of the present invention. The load balance circuit 40 may realize the transmitter TX in FIG. 1 and the load balance circuit 320 in FIG. 3. The load balance circuit 40 may comprise a storing circuit 400, a user field number generation circuit 410 and a load balance calculation circuit 420. In detail, the storing circuit 400 is for storing at least one first user field number corresponding to at least one first node in a minimum full binary tree (e.g. receiving the at least one first user field number from the node computation circuit 310), wherein at least one first RU corresponding to the at least one first node is smaller than or equal to a RU size (e.g. a 242-tone). The user field number generation circuit 410 is coupled to the storing circuit 400, and is for generating at least one third user field number according to at least one second user field number corresponding to at least one second node in the minimum full binary tree, and generating at least one second weight according to at least one first weight corresponding to the at least one second node, wherein at least one second RU corresponding to the at least one second node is greater than the RU size (e.g. an RU or a multiple RU (MRU) with an RU size greater than a 242-tone, such as an MRU with a 484+242-tone, an MRU with a 996+484-tone, an MRU with a 992×2+484-tone, an MRU with a 996×3-tone or an MRU with a 996×3+484-tone, but not limited herein). The load balance calculation circuit 420 is coupled to the user field number generation circuit 410, and is for generating a plurality of first user field numbers corresponding to a plurality of content channels according to the at least one first user field number, the at least one third user field number, the at least one second weight, a load balance function and the at least one first weight, to ensure that the plurality of first user field numbers carried by the plurality of content channels are the same or similar.

In one example, the storing circuit 400 may store information of the minimum full binary tree (e.g. connection information of nodes which are null nodes, assignment nodes or reservation nodes). In one example, the storing circuit 400 may store the at least one second user field number corresponding to the at least one second node in the minimum full binary tree. In one example, the at least one second node may store at least one MRU information. In one example, the at least one MRU information may comprise an MRU flag. The MRU flag may comprise 2 bits, and may indicate that an RU corresponding to a node is a non-MRU, a start resource location of an MRU, a middle resource location of an MRU or an end resource location of an MRU.

In one example, the user field number generation circuit 410 may generate the at least one third user field number according to the at least one second user field number and the at least one MRU information. In one example, the user field number generation circuit 410 may update the at least one second user field number to the at least one third user field number, e.g. by a user field number corresponding to an RU being configured to 0, to generate the at least one third user field number, when an MRU information in the at least one MRU information indicates that an RU in the at least one second RU comprises (e.g. is) an MRU and the MRU is at an end resource location (or a middle resource location).

In one example, the user field number generation circuit 410 may generate the at least one first weight according to at least one first bandwidth corresponding to the at least one second node. In one example, each first bandwidth may be an i-th 80 MHz sub-bandwidth of at least one 80 MHz sub-bandwidth generated by dividing a bandwidth (e.g. 160 MHz or 320 MHz) according to an 80 MHz sub-bandwidth, wherein i is one or more integer values from 1 to 4: i.e. the bandwidth is 20 MHz, 40 MHz or 80 MHz, and corresponds to a first bandwidth. Each first weight may comprise i (e.g. 4) groups of bits, wherein an i-th group of bits is for indicating whether a node corresponds to the i-th 80 MHz sub-bandwidth. In one example, the i-th group of bits indicates the node corresponds to the i-th 80 MHz sub-bandwidth when the i-th group of bits is "1", and the i-th group of bits indicates the node does not correspond to the i-th 80 MHz sub-bandwidth, when the i-th group of bits is "∞". For example, the user field number generation circuit 410 generates first weights of a node of the at least one second node as [1, ∞, ∞, ∞], when the node corresponds to a 1st 80 MHz sub-bandwidth. For example, the user field number generation circuit 410 generates first weights of a node of the at least one second node as [∞, 1, ∞, ∞], when the node corresponds to a 2nd 80 MHz sub-bandwidth. For example, the user field number generation circuit 410 generates first weights of a node of the at least one second node as [∞, ∞, 1, 1], when the node corresponds to a 3rd 80 MHz sub-bandwidth and a 4th 80 MHz sub-bandwidth. In other words, a single node may correspond to multiple 80 MHz sub-bandwidths.

In one example, the user field number generation circuit 410 may generate the at least one second weight according to the at least one first weight and the at least one MRU information. In detail, the user field number generation circuit 410 may obtain which nodes of the at least one second node belong to the same MRU according to the at least one MRU information, and generates second weights of the nodes by combining first weights of the nodes, wherein the nodes belonging to the same MRU have the same weight. For example, first weights of a node of the at least one second node are [1, ∞, ∞, ∞], and MRU information stored by the node indicates that the node corresponds to an MRU and the MRU is at a beginning resource location. First weights of other nodes of the at least one second node are [∞, 1, ∞, ∞], and MRU information stored by the other node indicates that the other node corresponds to an MRU and the MRU is at an end resource location. The user field number generation circuit 410 generates second weights of the node and the other node as [1, 1, ∞, ∞], by combining the first weights [1, ∞, ∞, ∞] of the node and the first weights [∞, 1, ∞, ∞] of the other node.

In one example, the load balance calculation circuit 420 may generate a plurality of second user field numbers corresponding to the plurality of content channels, i.e. a plurality of initial user field numbers, according to (e.g. by using) the at least one first user field number, the at least one third user field number and the at least one second weight, and the load balance function. In one example, the load balance calculation circuit 420 may generate the plurality of first user field numbers corresponding to the plurality of content channels, i.e. a plurality of updated user field numbers, according to (e.g., by using) the plurality of second user field numbers and the at least one first weight. In one example, the load balance calculation circuit 420 may generate a length of the plurality of content channels according to a maximum user field number of the plurality of first user field numbers. In one example, the RU size may comprise a 26-tone, a 52-tone, a 106-tone, a 242-tone, a 484-tone, a 996-tone, a 996×2-tone and a 996×4-tone, wherein a 26-tone RU may be composed of two 13-tone RUs. An MRU comprises a combination of multiple RUs, e.g. a 52+26-tone, a 106+26-tone, a 242+484-tone, a 996+484-tone, a 996×2+484-tone, a 996×3-tone, a 996×3+484-tone and a 996+484+242-tone, but is not limited herein.

In one example, the load balance function is realized according to the following equation (Eq. 1):

$$\min\max{}_{X,Y}\{L_1^1, L_2^1, L_1^2, L_2^2, L_1^3, L_2^3, L_1^4, L_2^4\}, \text{ s.t.}$$
$$\Sigma_{s \in S}(x_i^s + y_i^s)\cdot(z_i^s) = k_i, \forall i \in \mathcal{L}\ x_i^s \in N, \forall i \in \mathcal{L}, \forall s \in S$$
$$y_i^s \in N, \forall i \in \mathcal{L}, \forall s \in S\ z_i^s \in \{1, \infty\}, \forall i \in \mathcal{L}, \forall s \in S \quad \text{(Eq. 1)}$$

wherein $\mathcal{L}$ is an RU index indicating an RU with an RU size greater than the 242-tone (e.g. the 484-tone, the 996-tone, the 996×2-tone or the 996×4-tone) or an MRU with an RU size greater than the 242-tone (e.g. the 484+242-tone, the 996+484-tone, the 996×2+484-tone, the 996×3-tone or the 996×3+484-tone); S is a set of indexes of a bandwidth divided by an 80 MHz sub-bandwidth (e.g. a bandwidth is 320 MHz, and S={1, 2, 3, 4}); $L_1^s$ is a user field number of a first content channel corresponding to an s-th 80 MHz sub-bandwidth, and is expressed as $L_1^s = \Sigma_i[x_i^s \cdot z_i^s + N_1^s]$;

$L_2^s$ is a user field number of a second content channel corresponding to the s-th 80 MHz sub-bandwidth, and is expressed as $L_2^s = \Sigma_i[y_i^s \cdot z_i^s + N_2^s]$; $N_c^s$ is a user field number of a c-th content channel corresponding to the s-th 80 MHz sub-bandwidth corresponding to a node of an RU configured (e.g. signaled) with an RU size smaller than or equal to the 242-tone (e.g. the 26-tone, the 52-tone, the 106-tone or the 242-tone) or an MRU configured (e.g., signaled) with an RU size smaller than or equal to the 242-tone (e.g. the 52+26-tone or the 106+26-tone), wherein c is 1 or 2; $k_i$ is a user field number configured (e.g., signaled) to an i-th node, and the user field number corresponds to an RU or an MRU with an RU size greater than the 242-tone; $z_i^s$ is a weight value indicating whether the i-th node corresponds to the s-th 80 MHz sub-bandwidth; $x_i^s$ is a user field number of the i-th node corresponding to an RU configured to the first content channel, and a set of all $x_i^s$ is user field numbers of all nodes corresponding to the RU configured to the first content channel and is expressed as X={$x_i^s$|∀i∈ $\mathcal{L}$, ∀s∈S}; $y_{ti}$ is a user field number of the i-th node corresponding to an RU configured to the second content channel, and a set of all $y_i$ is a user field number of all nodes corresponding to the RU configured to the second content channel and is expressed as Y={$y_i^s$|∀i∈ $\mathcal{L}$, ∀s∈S}; and N is the set of all natural numbers.

The load balance function (Eq. 1) is an integer programming problem, and belongs to a non-deterministic polynomial-time complete (NP complete) problem. A time complexity is reduced by a transformation (e.g. a simplification), and the load balance function (Eq. 1) is realized according to the following equation (Eq. 2).

$$\min_{X,Y,t} t \quad \text{(Eq. 2)}$$
$$\text{s.t. } \sum_{s=1}^{4}(x_i^s + y_i^s)\cdot(z_i^s) = k_i, \forall i$$
$$x_i^s \in N, \forall i, \forall s$$
$$y_i^s \in N, \forall i, \forall s$$
$$\sum_{s=1}^{4} x_i^s + N_1^s \le t, \forall s$$
$$\sum_{s=1}^{4} y_i^s + N_2^s \le t, \forall s$$

Figure 5:
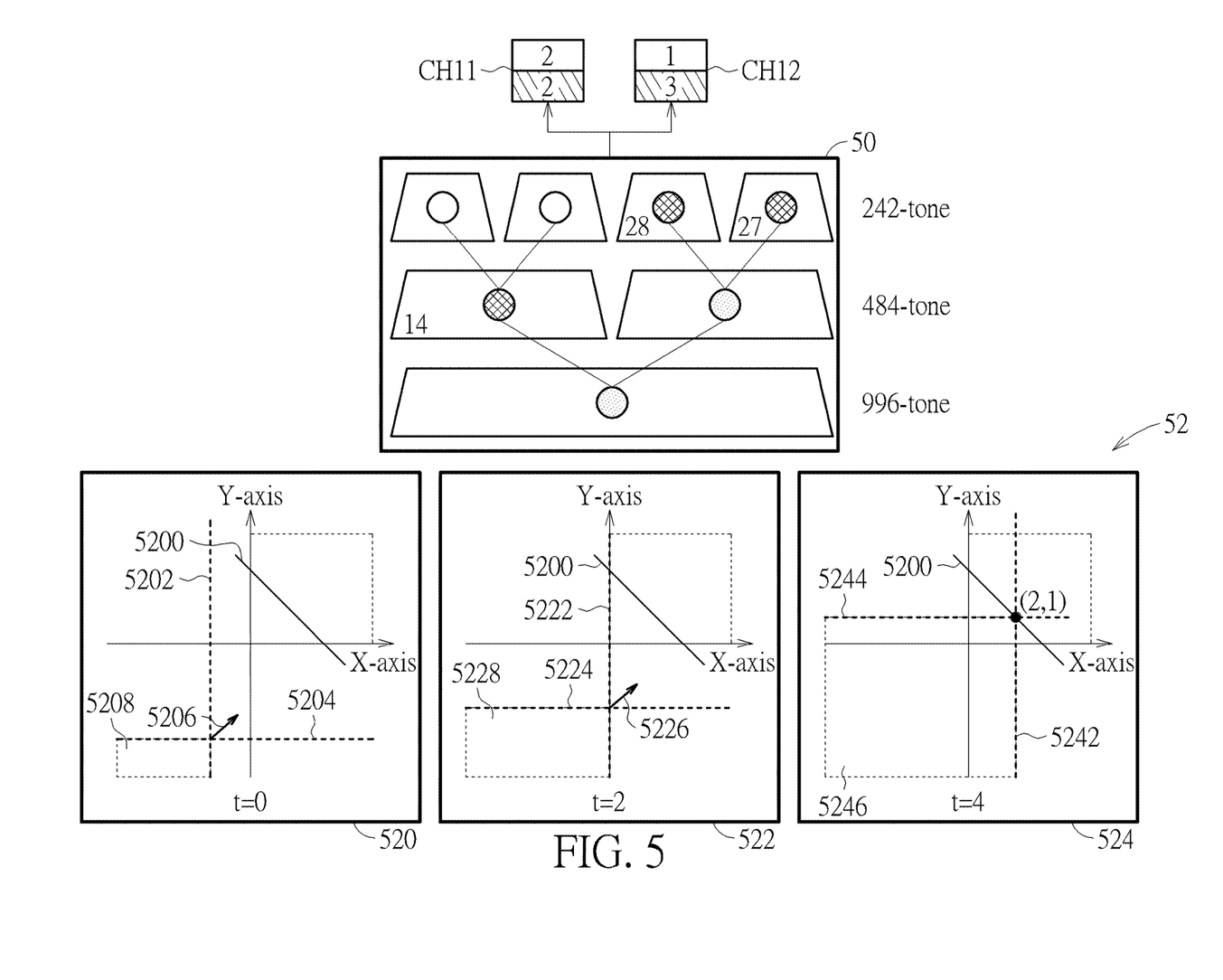
FIG. 5 is a schematic diagram of a load balance function for a resource unit in an 80 MHz bandwidth according to an example of the present invention.

FIG. 5 is a schematic diagram of a load balance function for a resource unit in an 80 MHz bandwidth according to an example of the present invention. FIG. 5 shows a full binary tree 50 representing RUs in the 80 MHz bandwidth, and shows a process 52 for generating user field numbers according to the load balance function (Eq. 2). The process 52 comprises processes 520, 522 and 524, all of which comprise an X-axis and a Y-axis. The following illustrates how the load balance calculation circuit 420 generates the plurality of user field numbers corresponding to the plurality of content channels according to the load balance function (Eq. 2) according to FIG. 5. An RU is shown as a trapezoid, and the full binary tree 50 comprises three levels from top to bottom, i.e. four 242-tone RUs (e.g. comprising 242 subcarriers), two 484-tone RUs and one 996-tone RU. Each RU has an RU index (e.g. the RU index may correspond to a frequency defined in the 3rd Generation Partnership Project (3GPP) standard or its subsequent standards, a frequency determined by the transmitter TX or a frequency defined in the 802.11 standard). In FIG. 5, the full binary tree 50 is shown as a tree structure, which comprises a plurality of nodes. The plurality of nodes corresponds to the plurality of the RUs, respectively. In addition, unfilled circles represent null nodes, grid circles represent nodes for which scheduled stations are configured, and dotted circles represent reserved nodes. The grid circles and the dotted circles may form a minimum full binary tree, and information of the minimum full binary tree may be stored (e.g. received) by the load balance circuit 40. For brevity, RU indexes of the RUs corresponding to the grid circles are marked as 14, 27 and 28, and the nodes with the RU indexes 14, 27 and 28 are called nodes 14, 27, and 28, respectively.

According to the load balance function (Eq. 2), since FIG. 5 only involves one 80 MHz bandwidth, s in the load balance function (Eq. 2) is 1 and $z_{14}^1$ is 1, a user field number of the node 14 is denoted as $k_{14}$ (i.e., i is 14), a user field number of the node 27 is denoted as $k_{27}$, and a user field number of the node 28 is denoted as $k_{28}$. In the case that RUs corresponding to the nodes 27 and 28 are, respectively, smaller than and equal to the 242-tone, the load balance calculation circuit 420 assigns (e.g. adds) the user field number $k_{27}$ carried by the node 27 to the second content channel (i.e., $N_2^1$ is 3) and assigns (e.g., adds) the user field number $k_{28}$ carried by the node 28 to the first content channel (i.e. $N_1^1$, is 2) according to the load balance function (Eq. 2), since the nodes 27 and 28 belong to leaf nodes of the minimum full binary tree. In the case that an RU corresponding to the node 14 is greater than the 242-tone, the load balance calculation circuit 420 further assigns (e.g., adds) the user field number $k_{14}$ of the node 14 to the first content channel and the second content channel according to the load balance function (Eq. 2), to ensure that the user field numbers carried by the first content channel and the second content channel are the same or similar. As can be seen, the load balance function (Eq. 2) may be simplified to the following equations (Eq. 3)-(Eq. 5), to generate common solutions $x_{14}^1$ and $y_{14}^1$ with a minimum content channel length t:

$$k_{14} = x_{14}^1 + y_{14}^1 \quad \text{(Eq. 3)}$$

$$x_{14}^1 + k_{28} \leq t \quad \text{(Eq. 4)}$$

$$y_{14}^1 + k_{27} \leq t \quad \text{(Eq. 5)}$$

For brevity, it is assumed that $k_{14}$ is 3 in the equation (Eq. 3), $k_{27}$ is 3 in the equation (Eq. 5) and $k_{28}$ is 2 in the equation (Eq. 4). In the process 52, t is an integer, e.g. 0, 2, and 4, but is not limited herein. In the case that t is 0, the process 520 shows that a solid line 5200 represents $x_{14}^1 + y_{14}^1 = 3$, a dashed line 5202 represents $x_{14}^1 = -2$ and a dashed line 5204 represents $y_{14}^1 = -3$. The three lines 5200, 5202 and 5204 do not intersect, which means that the conditional equations (Eq. 3)-(Eq. 5) do not have a common solution and therefore a content channel length satisfying the conditional equations (Eq. 3)-(Eq. 5) is not found. An arrow 5206 represents a moving direction of a range 5208 (i.e. the solution set) enclosed by the two dashed lines 5202 and 5204 toward the solid line 5200 as t increases. In the case that t is 2, the process 522 shows that a solid line 5200 represents $x_{14}^1 + y_{14}^1 = 3$, a dashed line 5222 represents $x_{14}^1 = 0$ and a dashed line 5224 represents $y_{14}^1 = -1$. The three lines 5200, 5222 and 5224 do not intersect, which means that the conditional equations (Eq. 3)-(Eq. 5) do not have the common solution and therefore the content channel length satisfying the conditional equations (Eq. 3)-(Eq. 5) is still not found. An arrow 5226 represents a moving direction of a range 5228 (i.e. the solution set) enclosed by the two dashed lines 5222 and 5224 toward the solid line 5200 as t increases. In the case that t is 4, the process 524 shows that a solid line 5200 represents $x_{14}^1 + y_{14}^1 = 3$, a dashed line 5242 represents $x_{14}^1 = 2$ and a dashed line 5244 represents $y_{14}^1 = 1$. The solid 5200 and a range 5246 enclosed by the two dashed lines 5242 and 5242 intersect at a coordinate point (2, 1), which means that a minimum t satisfying the conditional equations (Eq. 3)-(Eq. 5) is found as 4, and the solutions are $x_{14}^1 = 2$ and $y_{14}^1 = 1$. It should be noted that, in addition to the above integers, t may be any other integer that satisfies the conditional equations (Eq. 3)-(Eq. 5), to obtain other common solutions. The minimum t satisfying the conditional equations (Eq. 3)-(Eq. 5) is the optimal solution, however, since $x_{14}^1$ and $y_{14}^1$ represent the user field numbers.

As can be seen, in the case that the RUs corresponding to the nodes 27 and 28 are smaller than or equal to the 242-tone, the user field number carried by the node 27 (i.e. $k_{27}$ is 3) is assigned to the second content channel and the user field number carried by the node 28 (i.e. $k_{28}$ is 2) is assigned to the first content channel, as indicated by the numbers in boxes filled with slashes in the first content channel CH11 and the second content channel CH12. In the case that the RU corresponding to the node 14 is greater than the 242-tone, the RU carries multiple user information. According to the load balance function (Eq. 2), in the user field number carried by the node 14 (i.e. $k_{14}$ is 3), two user field numbers are assigned to the first content channel and one user field number is assigned to the second content channel, as indicated by the numbers in boxes unfilled with slashes in the first content channel CH11 and the second content channel CH12. Accordingly, the user field number carried by the first content channel CH11 is 4, and the user field number carried by the second content channel is 4. The length of the content channels is the maximum user field number, i.e. 4, since the length of the content channels is based on the content channel that carries more user fields. It should be noted that the above nodes and the user field numbers carried by them are only used for illustrating the calculation process of the load balance function (Eq. 2), rather than for limiting the present invention.

Figure 6:
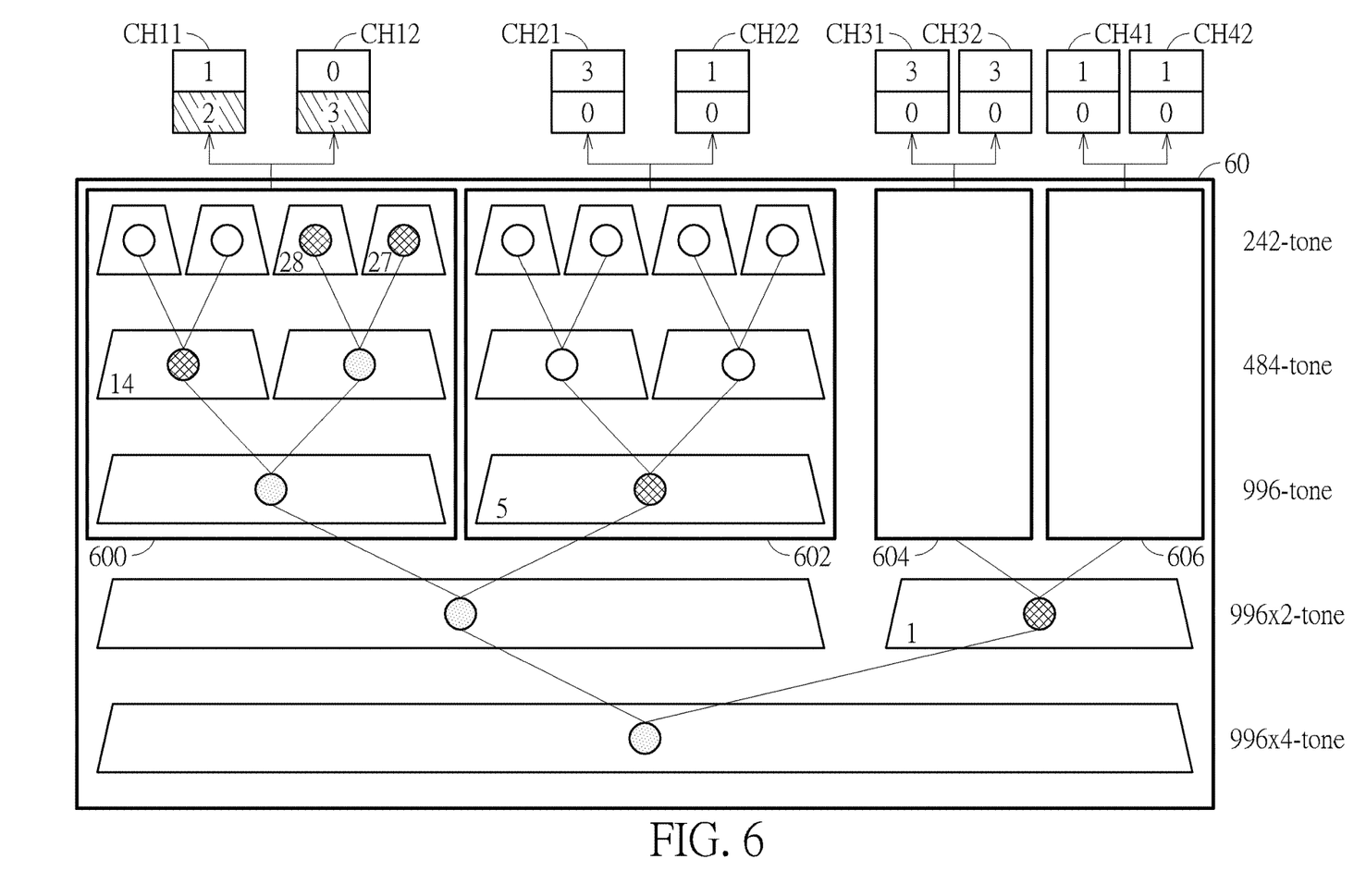
FIG. 6 is a schematic diagram of a load balance function for a resource unit in a 320 MHz bandwidth according to an example of the present invention.

FIG. 6 is a schematic diagram of a load balance function for a resource unit in a 320 MHz bandwidth according to an example of the present invention. FIG. 6 shows a first sub-full binary tree 600 representing a $1^{st}$ 80 MHz bandwidth, a second sub-full binary tree 602 representing a $2^{nd}$ 80 MHz bandwidth, a third sub-full binary tree 604 representing a $3^{rd}$ 80 MHz bandwidth and a fourth sub-full binary tree 606 representing a $4^{th}$ 80 MHz bandwidth. An RU is shown as a trapezoid, and a full binary tree 60 comprises give levels from top to bottom, i.e. sixteen 242-tone RUs, eight 484-tone RUs, four 996-tone RUs, two 996×2-tone RUs and one 996×4-tone. Each RU has an RU index (wherein nodes of the third sub-full binary tree 604 and the fourth sub-full binary tree 606 are null nodes, and thus the RUs corresponding to the null nodes are not shown in FIG. 6). In FIG. 6, the full binary tree 60 is shown as a tree structure in which each sub-full binary tree comprises a plurality of nodes. The plurality of nodes corresponds to the plurality of the RUs, respectively (wherein the nodes of the third sub-full binary tree 604 and the fourth sub-full binary tree 606 are the null nodes, and are not shown in FIG. 6). In addition, unfilled circles represent null nodes, grid circles represent nodes for which scheduled stations are configured, and dotted circles represent reserved nodes. The grid circles and the dotted circles may form a minimum full binary tree, and information of the minimum full binary tree may be stored (e.g. received) by the load balance circuit 40. For brevity, RU indexes of the RUs corresponding to the grid circles are marked as 1, 5, 14, 27 and 28, and the nodes with the RU indexes 1, 5, 14, 27 and 28 are called nodes 14, 27, and 28, respectively.

The following illustrates how the load balance calculation circuit 420 generates the plurality of first user field numbers corresponding to the plurality of content channels using the load balance function (Eq. 2) according to FIG. 6. The transmitter TX may receive a resource assignment (e.g. a resource configuration from the most negative frequency to the most positive frequency is: an MRU with a 996+484-tone, an RU with a 106-tone, an MRU with a 106+26-tone, an RU with a 106-tone, an RU with a 26-tone, an RU with a 106-tone and an RU with a 996×2-tone) of eighteen scheduled stations (e.g. {(1, 2, 3, 4, 5), (6, 7), (8, 9, 10), (11, 12, 13, 14, 15, 16, 17, 18)}) of an upper layer (e.g. Media Access Control (MAC) layer) and may generate a minimum full binary tree (e.g. by using the splitting circuit 340, the RU assignment circuit 300 and the node computation circuit 310 in FIG. 3, but not limited herein), before the load balance calculation circuit 420 generates the plurality of first user field numbers.

In FIG. 6, in the minimum full binary tree, the RU with the 996×2-tone corresponds to the node 1, and the node 1 corresponds to the third sub-full binary tree 604 and the fourth sub-full binary tree 606. Accordingly, first weights of the node 1 are [∞, ∞, 1, 1]. The MRU with the 996+484-tone may be divided to an RU with the 484-tone and an RU with the 996-tone which correspond to the nodes 14 and 5, respectively. The node 14 is at a beginning resource location, and the node 5 is at an end resource location. The node 14 corresponds to the first sub-full binary tree 600, and thus first weights of the node 14 are [1, ∞, ∞, ∞]. The node 5 corresponds to the second sub-full binary tree 602, and thus first weights of the node 5 are [∞, 1, ∞, ∞]. The RU with the 106-tone and the MRU with the 106+26-tone correspond to the node 28, and the node 28 corresponds to the first sub-full binary tree 600. The RU with the 106-26-106-tone corresponds to the node 27, and the node 27 corresponds to the first sub-full binary tree 600.

For brevity, it is assumed that the user field number of the node 1 is 8 ($k_1$ is 8), the user field number of the node 14 is 5 ($k_{14}$ is 5), the user field number of the node 5 is 5 ($k_5$ is 5) (the nodes 5 and 14 belong to the same MRU (i.e. belong to the same scheduled station) and have the same user field number), the user field number of the node 27 is 3 ($k_{27}$ is 3) and the user field number of the node 28 is 2 ($k_{28}$ is 2).

In the case that the RUs corresponding to the nodes 27 and 28 are, respectively, smaller than or equal to the 242-tone, the storing circuit 400 stores $k_{27}$ and $k_{28}$. In the case that the nodes 27 and 28 belong to the leaf nodes of the first sub-full binary tree 600, the load balance calculation circuit 420 assigns (e.g. adds) the user field number $k_{28}$ to the first content channel, and assigns (e.g., adds) the user field number $k_{27}$ to the second content channel, as indicated by the numbers in boxes filled with slashes in the first content channel CH11 and the second content channel CH12. In the case that the RUs corresponding to the nodes 14, 5 and 1 are greater than the 242-tone, since the nodes 14 and 5 belong to the same MRU and the node 5 is at the end resource location, the user field number generation circuit 410 configures the use field number of the node 5 ($k_5$ is 5) as 0, i.e. updates $k_5$ to 0. In addition, the user field number generation circuit 410 generates second weights of the nodes 14 and 5 as [1, 1, ∞, ∞] according to (e.g. by combining) the first weights [1, ∞, ∞, ∞] of the node 14 and the first weights [∞, 1, ∞, ∞] of the node 5. According to $k_{27}$ being 3 and $k_{28}$ being 2 (i.e. the use field number carried by the first content channel is 2, and the user field number carried by the second content channel is 3), the load balance calculation circuit 420 further assigns (e.g., adds) $k_{14}$ being 5, $k_5$ being 0 and $k_1$ being 8 to the first content channel and the second content channel, to ensure that the user field numbers carried by the first content channel and the second content channel are the same or similar.

According to the load balance function (Eq. 2), five user fields are further assigned to the first content channels and the second content channels in the $1^{st}$ 80 MHz sub-bandwidth and the 2nd 80 MHz sub-bandwidth, so that the maximum length of the content channels in the $1^{st}$ 80 MHz sub-bandwidth is 3 and the lengths of the first content channel and the second content channel in the $2^{nd}$ 80 MHz sub-bandwidth are smaller than or equal to 3 (e.g. the user fields number carried by the first content channel CH11 corresponding to the first sub-full binary tree 600 corresponding to the node 14 is 12, the user fields number carried by the second content channel CH12 corresponding to the first sub-full binary tree 600 corresponding to the node 14 is 0, the user fields number carried by the first content channel CH21 corresponding to the second sub-full binary tree 602 corresponding to the node 14 is 3, and the user fields number carried by the second content channel CH22 corresponding to the second sub-full binary tree 602 corresponding to the node 14 is 1). According to the load balance function (Eq. 2), eight user fields are further assigned to the first content channels and the second content channels in the 3rd 80 MHz sub-bandwidth and the 4th 80 MHz sub-bandwidth, so that the maximum length of the content channels in the $1^{st}$ 80 MHz sub-bandwidth is 3 and the lengths of the first content channel and the second content channel in the 2nd 80 MHz sub-bandwidth are smaller than or equal to 3 (e.g. the user field number carried by the first content channel CH31 corresponding to the third sub-full binary tree 604 corresponding to the node 1 is 3, the user field number carried by the second content channel CH32 corresponding to the third sub-full binary tree 604 corresponding to the node 1 is 3, the user field number carried by the first content channel CH41 corresponding to the fourth sub-full binary tree 606 corresponding to the node 1 is 1, and the user field number carried by the second content channel CH42 corresponding to the fourth sub-full binary tree 606 corresponding to the node 1 is 1). Accordingly, the load balance calculation circuit 420 may generate the optimal t value and the common solution of the load balance function (Eq. 2). Since the length of the content channel is based on the content channel that carries more user fields in the 80 MHz sub-bandwidth, the length of the content channel that may be obtained is the maximum number of user fields, i.e. 3. It should be noted that the above nodes and the user field numbers carried by them are only used for illustrating the calculation process of the load balance function (Eq. 2), rather than for limiting the present invention.

In addition, the user field numbers carried by the first content channel CH11~CH41 corresponding to the node 14 may be regarded as the initial user field numbers [1, 3, 0, 0] of the node 14. Since the nodes 14 and 5 belong to the same MRU, the initial user field numbers of the node 5 may be regarded as the initial user field numbers [1, 3, 0, 0] of the node 14. The load balance calculation circuit 420 may generate the plurality of updated user field numbers [1, 0, 0, 0] of the node 14 according to the initial user field numbers [1, 3, 0, 0] of the node 14 and the first weights [1, ∞, ∞, ∞]. The load balance calculation circuit 420 may generate the plurality of updated user field numbers [0, 3, 0, 0] of the node 5 according to the initial user field numbers [1, 3, 0, 0]

of the node 5 and the first weights [∞, 1, ∞, ∞]. The method for generating the plurality of updated user field numbers carried by the first content channels corresponding to the node 1 is similar to that of the node 5 and the node 14, and is not narrated herein. The method for generating the plurality of updated user field numbers carried by the second content channels corresponding to the nodes 14, 5 and 1 is as described above, and is not narrated herein.

Figure 7:
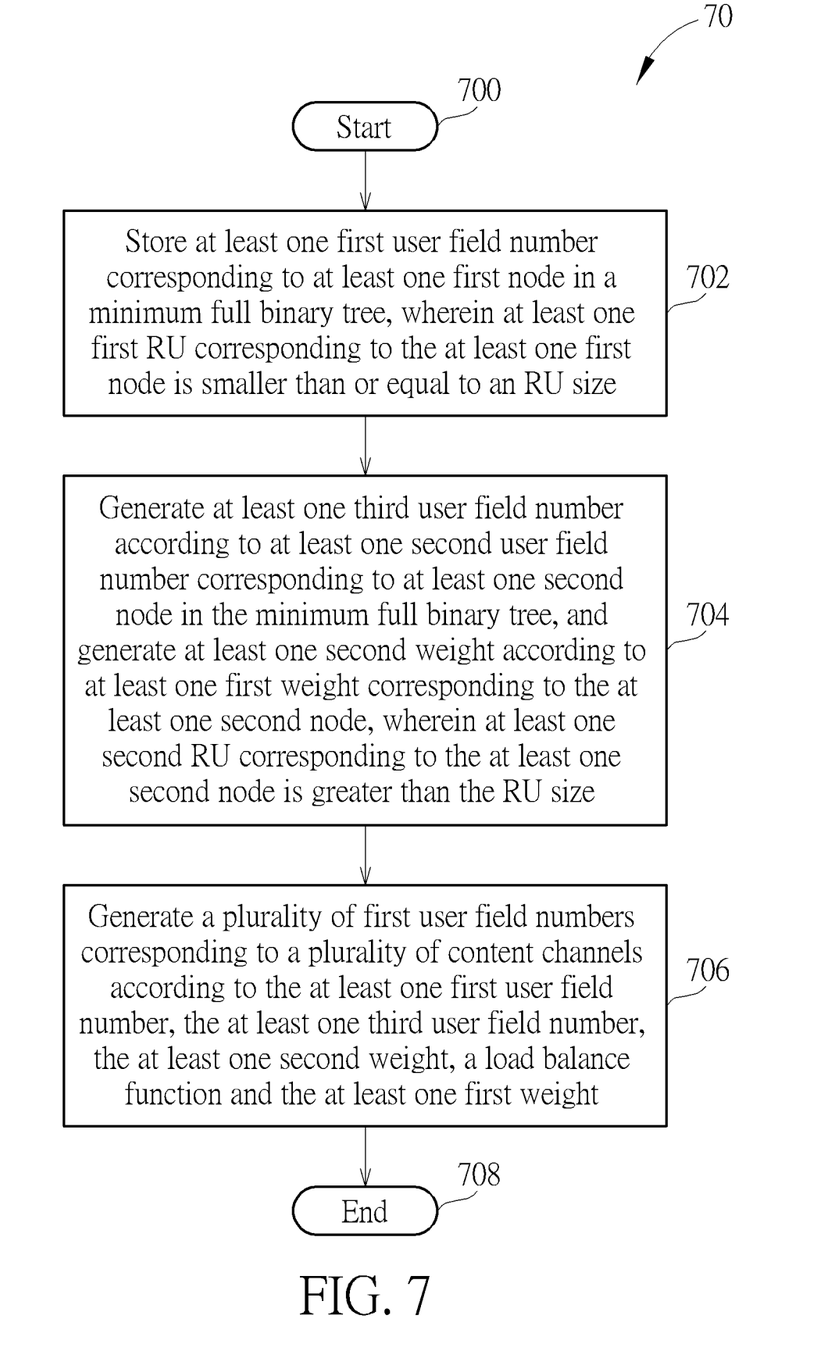
FIG. 7 is a flowchart of a process according to an example of the present invention.

Operations of the load balance circuit 40 in the above examples can be summarized into a process 70 shown in FIG. 7. The process 70 includes the following steps:

Step 700: Start.

Step 702: Store at least one first user field number corresponding to at least one first node in a minimum full binary tree, wherein at least one first RU corresponding to the at least one first node is smaller than or equal to an RU size.

Step 704: Generate at least one third user field number according to at least one second user field number corresponding to at least one second node in the minimum full binary tree, and generate at least one second weight according to at least one first weight corresponding to the at least one second node, wherein at least one second RU corresponding to the at least one second node is greater than the RU size.

Step 706: Generate a plurality of first user field numbers corresponding to a plurality of content channels according to the at least one first user field number, the at least one third user field number, the at least one second weight, a load balance function and the at least one first weight.

Step 708: End.

The process 70 is used for illustrating a method for generating the plurality of first user field numbers corresponding to the plurality of the content channels in the load balance circuit 40. Detailed description and variations of the process 70 can be known by referring to the previous description, and are not narrated herein.

The operations of "generate" and "obtain" described above may be replaced by the operations of "calculate" and "compute". It should be noted that realizations of the load balance circuit 40 (and the circuits in the load balance circuit 40) are various. For example, the circuits mentioned above may be integrated into one or more circuits. In addition, the load balance circuit 40 may be realized by hardware (e.g. circuits), software, firmware (known as a combination of a hardware device, computer instructions and data that reside as read-only software on the hardware device), an electronic system or a combination of the devices mentioned above, but are not limited herein.

To sum up, the present invention provides a circuit and a method of handling load balance. The transmitter TX efficiently generates a user field with a short length and a content channel with a short length by using the load balance function, and further generates an EHT-SIG field with a shorter length, to improve the bandwidth utilization efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A load balance circuit, comprising:
  a storing circuit, for storing at least one first user field number corresponding to at least one first node in a minimum full binary tree, wherein at least one first resource unit (RU) corresponding to the at least one first node is smaller than or equal to an RU size;
  a user field number generation circuit, coupled to the storing circuit, for generating at least one third user field number according to at least one second user field number corresponding to at least one second node in the minimum full binary tree, and generating at least one second weight according to at least one first weight corresponding to the at least one second node, wherein at least one second RU corresponding to the at least one second node is greater than the RU size; and
  a load balance calculation circuit, coupled to the user field number generation circuit, for generating a plurality of first user field numbers corresponding to a plurality of content channels according to the at least one first user field number, the at least one third user field number, the at least one second weight, a load balance function and the at least one first weight.

2. The load balance circuit of claim 1, wherein the at least one second node stores at least one multiple RU (MRU) information.

3. The load balance circuit of claim 2, wherein the user field number generation circuit generates the at least one third user field number according to the at least one second user field number and the at least one MRU information.

4. The load balance circuit of claim 3, wherein the user field number generation circuit updates the at least one second user field number to generate the at least one third user field number, when an MRU information in the at least one MRU information indicates that an RU in the at least one second RU comprises an MRU and the MRU is at an end resource location.

5. The load balance circuit of claim 2, wherein the user field number generation circuit generates the at least one second weight according to the at least one first weight and the at least one MRU information.

6. The load balance circuit of claim 2, wherein the user field number generation circuit generates the at least one first weight according to at least one first bandwidth corresponding to the at least one second node.

7. The load balance circuit of claim 1, wherein the load balance calculation circuit generates a plurality of second user field numbers corresponding to the plurality of content channels according to the at least one first user field number, the at least one third user field number and the at least one second weight, and the load balance function.

8. The load balance circuit of claim 7, wherein the load balance calculation circuit generates the plurality of first user field numbers corresponding to the plurality of content channels according to the plurality of second user field numbers and the at least one first weight.

9. The load balance circuit of claim 1, wherein the load balance calculation circuit generates a length of the plurality of content channels according to a maximum user field number of the plurality of first user field numbers.

10. A method for handling load balance, comprising:
  storing at least one first user field number corresponding to at least one first node in a minimum full binary tree, wherein at least one first resource unit (RU) corresponding to the at least one first node is smaller than or equal to an RU size;
  generating at least one third user field number according to at least one second user field number corresponding to at least one second node in the minimum full binary tree, and generating at least one second weight according to at least one first weight corresponding to the at least one second node, wherein at least one second RU corresponding to the at least one second node is greater than the RU size; and generating a plurality of first user field numbers corresponding to a plurality of content channels according to the at least one first user field number, the at least one third user field number, the at least one second weight, a load balance function and the at least one first weight.

\* \* \* \* \*